United States Patent [19]

Namekawa

[11] Patent Number: 5,335,264
[45] Date of Patent: Aug. 2, 1994

[54] METHOD AND APPARATUS FOR MONITORING SOUND WITHIN A VEHICLE BY TELEPHONE

[75] Inventor: Makoto Namekawa, Iwaki, Japan

[73] Assignee: Alpine Electronics, Inc., Tokyo, Japan

[21] Appl. No.: 131,108

[22] Filed: Oct. 1, 1993

Related U.S. Application Data

[63] Continuation of Ser. No. 843,782, Feb. 28, 1992, abandoned, which is a continuation of Ser. No. 120,221, Nov. 13, 1987, abandoned, which is a continuation of Ser. No. 881,893, Jul. 3, 1986, abandoned.

[30] Foreign Application Priority Data

Jul. 9, 1985 [JP] Japan ................... 60-150645

[51] Int. Cl.⁵ ............................................ H04M 11/00
[52] U.S. Cl. .................................... 379/58; 379/63; 340/825.32
[58] Field of Search .................. 379/44, 56, 58, 59, 379/61, 63; 340/531, 539, 825.31, 825.32; 235/375; 455/56, 58

[56] References Cited

U.S. PATENT DOCUMENTS

| | | |
|---|---|---|
| 3,427,402 | 2/1969 | Stokes . |
| 3,694,579 | 9/1972 | McMurray . |
| 3,787,624 | 1/1974 | Spitalay et al. . |
| 3,934,095 | 1/1976 | Matthews et al. . |
| 4,006,316 | 2/1977 | Bolgiano . |
| 4,009,375 | 2/1977 | White et al. . |
| 4,099,033 | 7/1978 | Murray . |
| 4,241,238 | 12/1980 | Strand . |
| 4,383,242 | 5/1983 | Sassover et al. ............... 340/539 |
| 4,394,540 | 5/1983 | Willis et al. . |
| 4,429,188 | 1/1984 | Allen . |
| 4,469,917 | 9/1984 | Shelley . |
| 4,486,624 | 12/1984 | Puhl et al. . |
| 4,493,947 | 1/1985 | Loveless .......................... 379/40 |
| 4,511,887 | 4/1985 | Fiore ................................ 340/539 |
| 4,558,181 | 12/1985 | Blanchard et al. . |
| 4,559,417 | 12/1985 | Komuro et al. . |
| 4,567,472 | 1/1986 | Shirai et al. ..................... 340/525 |
| 4,577,182 | 3/1986 | Millsap et al. .................. 340/539 |
| 4,585,904 | 4/1986 | Mincone et al. . |
| 4,631,527 | 12/1986 | De Witt et al. ................. 346/539 |
| 4,651,157 | 3/1987 | Gray et al. ...................... 340/539 |
| 4,661,972 | 4/1987 | Kai ..................................... 379/57 |
| 4,670,746 | 6/1987 | Taniguichi et al. .......... 340/825.31 |
| 4,672,375 | 6/1987 | Mochida et al. ............ 340/825.31 |
| 4,710,745 | 12/1987 | del Rosario ...................... 340/63 |
| 4,860,335 | 8/1989 | Namekawa ....................... 379/44 |

FOREIGN PATENT DOCUMENTS

| | | |
|---|---|---|
| 0077248 | 6/1980 | Japan . |
| 59-219038 | 12/1981 | Japan . |
| 57-24153 | 2/1982 | Japan . |
| 58-138134 | 8/1983 | Japan . |
| 58-164337 | 9/1983 | Japan . |
| 58-204640 | 11/1983 | Japan . |
| 60-41827 | 3/1985 | Japan ............................ 379/58 |
| 60-46627 | 3/1985 | Japan . |
| 60-119159 | 6/1985 | Japan . |
| 60-187143 | 9/1985 | Japan . |
| 60-214126 | 10/1985 | Japan ............................ 379/63 |
| 2086187A | 5/1982 | United Kingdom . |

Primary Examiner—James L. Dwyer
Assistant Examiner—Ahmad F. Matar
Attorney, Agent, or Firm—Guy W. Shoup; Patrick T. Bever

[57] ABSTRACT

A method of monitoring the sound within a car is disclosed. The occurrence of abnormality indicative of possible auto theft is reported to the driver who is remote from the car by means of the anti-theft system which transmits the occurrence of abnormality to a remote control unit and which turns on the power of the mobile telephone system, so as to make it ready for receiving external calls. The anti-theft system transmits to the driver the sound within the car collected by the microphone of the mobile telephone system, thereby making it possible for the driver at a remote place to ascertain the state of the car.

10 Claims, 5 Drawing Sheets

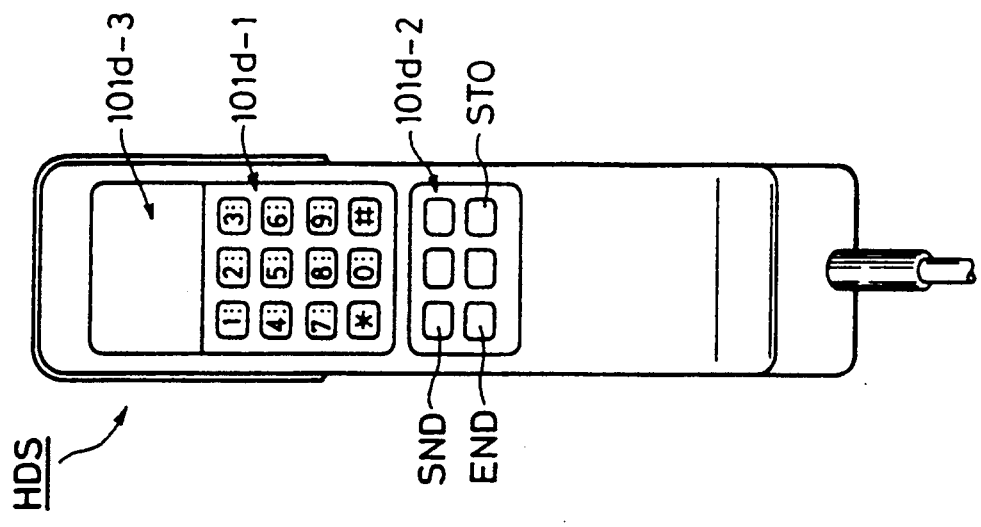
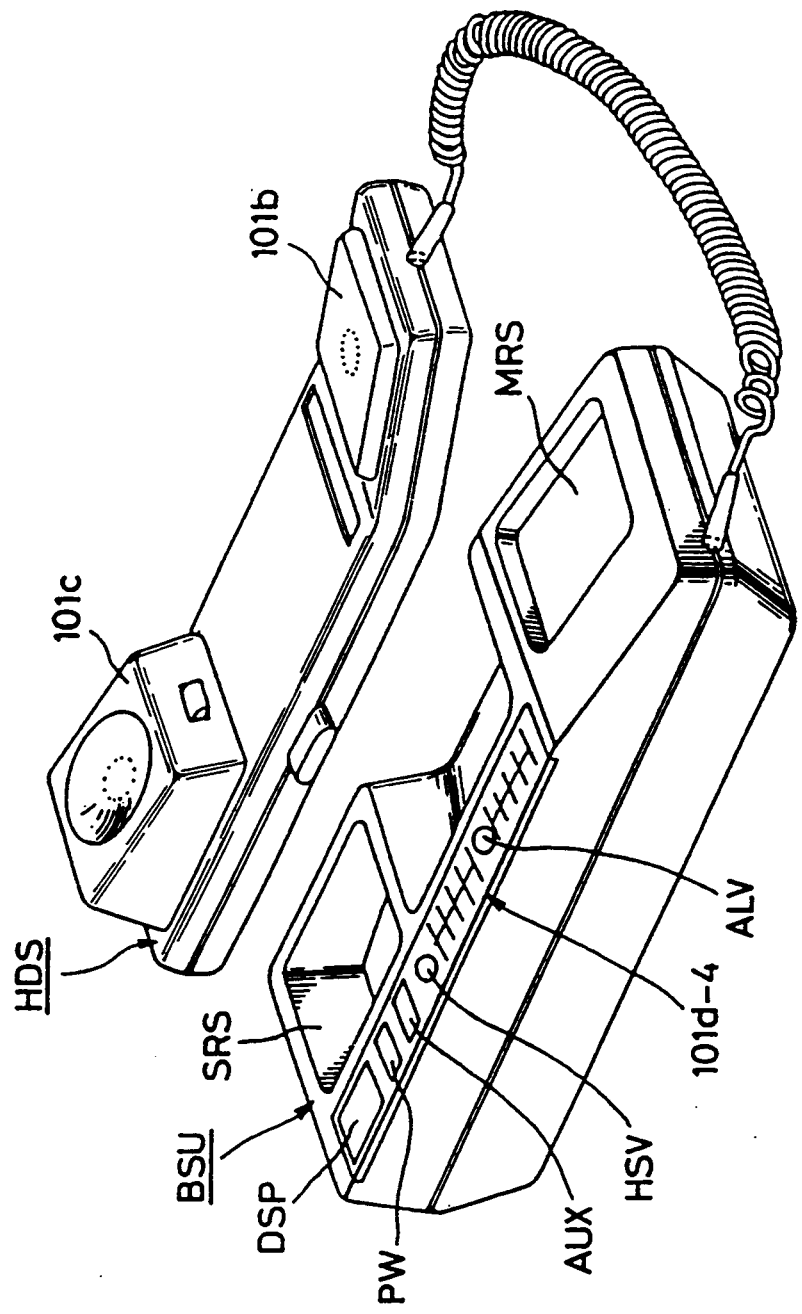

METHOD AND APPARATUS FOR MONITORING SOUND WITHIN A VEHICLE BY TELEPHONE

This application is a continuation of application Ser. No. 07/843,782, filed Feb. 28, 1992 (now abandoned); which is a continuation of Ser. No. 07/120,221, filed Nov. 13, 1987 (Now Abandoned); which is a continuation of Ser. No. 06/881,893, filed Jul. 3, 1986 (Now Abandoned).

BACKGROUND OF THE INVENTION

1. Field of the Invention

The present invention relates to a method of monitoring the sound within a car, and more particularly, to a method of monitoring the sound within a car at a place remote from the car by utilizing a mobile telephone system.

2. Description of the Prior Art

Anti-theft devices which prevent auto theft are conventionally known. When a thief attempts to steal a car incorporating such an anti-theft system by opening a door of the car, applying considerable force to the car, or opening the trunk, the anti-theft system is actuated to cause a siren to blow or the headlamps to be turned on and off, thereby obstructing the attempted theft.

However, the alarm sounded by the siren or flashing of the headlamps is only effective if there are people nearby, and does not exhibit sufficient deterrent in deserted locations or at night. Therefore the applicant of the present invention has proposed a method of reporting the occurrence of abnormality to the driver by transmitting that fact to a remote control unit, which thereby sounds an alarm.

Even when the car is not actually being stolen, the remote control unit sometimes sounds the alarm because the shock sensor is actuated by force applied from the outside, because a noise sensor is actuated by excessive external noise, or for other reasons. On the other hand, when the car is actually being stolen, it is sometimes dangerous for the owner to run to the car alone. In such a case, the owner will want to ascertain the state of the anti-theft system before running to the car when he receives the alarm from the remote control unit, but no method of ascertaining the state of the car secretly at a place remote from the car has heretofore been known.

SUMMARY OF THE INVENTION

Accordingly, it is an object of the present invention to provide a method of ascertaining at a place remote from a car (e.g., at home) whether the car is actually being stolen or not before running to the car at the time of the occurrence of abnormality.

It is another object of the present invention to provide a method of ascertaining the state of a car by monitoring the sound within the car.

To achieve this aim, a method of monitoring the sound within a car according to the present invention adopts an anti-theft system and a mobile telephone system having the following structure.

Referring to FIG. 1, which is a block diagram of a system to which a method of monitoring the sound within a car according to the present invention is applied, the symbol MTS denotes a mobile telephone system and MSP an anti-theft system.

The mobile telephone system MTS includes a control unit 101, a transceiver unit 102, a T-connector 103 and an antenna 104.

The control unit 101 includes a control portion 101a, a microphone 101b, a speaker 101c, an operation and display portion 101d, and so forth.

The anti-theft system MSP includes a main body 201 which is composed of a sensor portion 201a for detecting abnormality suggestive of theft, an operation portion having a keyboard structure, a control portion having a micro computer structure, etc., and a remote control unit 202, known as a "pager", which externally turns on and off the anti-theft function and outputs an alarm indicating the occurrence of something unusual.

The control unit 101 and the transceiver unit 102 are connected such as to allow communication between the two by a plurality of power source control lines, digital data transmission/reception lines, sound lines and the like. Several necessary lines are selected from them and are connected to the main body 201 of the anti-theft system MSP through the T-connector 103.

When the driver leaves the car, the anti-theft system MSP is actuated and and the power of the mobile telephone system MTS is turned off.

If the anti-theft system MSP detects something unusual relating to possible theft in this state, the main body 201 of the anti-theft system transmits that fact to the remote control unit 202 and at the same time turns on the power of the mobile telephone system MTS 50 as to render it capable of receiving external calls.

When the remote control unit 202 receives the information as to the occurrence of something unsual and sounds the alarm by means of a buzzer or the like, whereby the owner of the car is made aware of the fact that something unusual has occurred with his car.

Even when the car is not actually being stolen, the remote control unit sometimes sounds the alarm because the shock sensor is actuated by force applied from the outside, or because a noise sensor is actuated by excessive external noise. When the car is actually being stolen, it is dangerous for the owner to run to the car alone. If the owner wants to ascertain the state of the anti-theft system before running to the car in such a case, the mobile telephone system MTS is called from an external telephone and a predetermined code for monitoring the sound within the car is input.

When the mobile telephone system MTS receives the code for monitoring the sound within the car, it transmits the sound within the car which is collected by the microphone 101b transmits from the antenna 104 through the transmission portion of the transceiver unit 102. In this way, it is possible to monitor the sound within the car and thereby ascertain the state of the car at a place remote from the car.

The above and other objects, features and advantages of the present invention will become clear from the following description of the preferred embodiment thereof, taken in conjunction with the accompanying drawings.

BRIEF DESCRIPTION OF THE DRAWINGS

FIG. 4 is an external view of a control unit;

FIG. 5 is a view of the surface of a handset; and

DESCRIPTION OF THE PREFERRED EMBODIMENT

Figure 2:
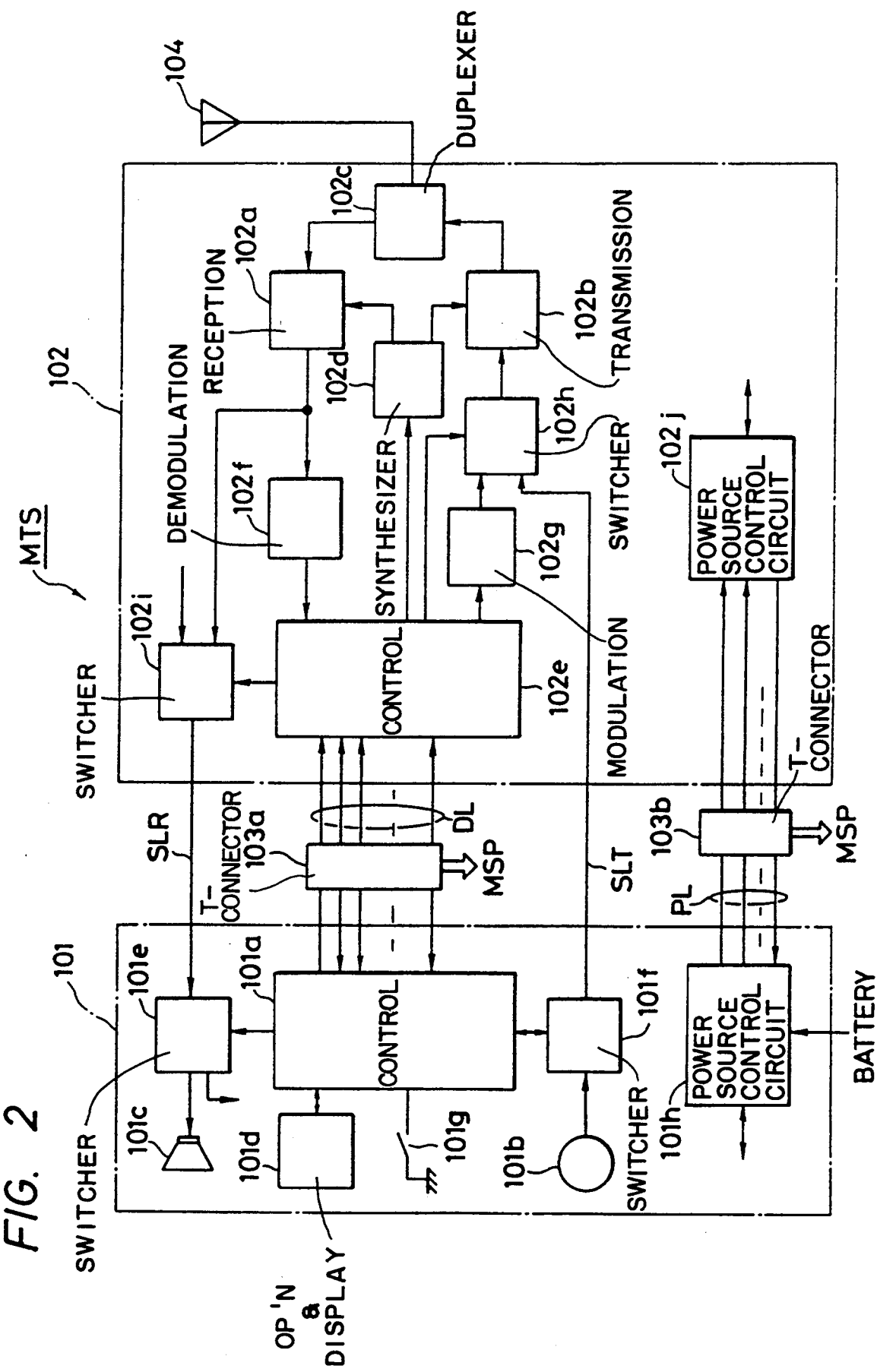
FIG. 2 is a block diagram of a mobile telephone system.
Figure 3:
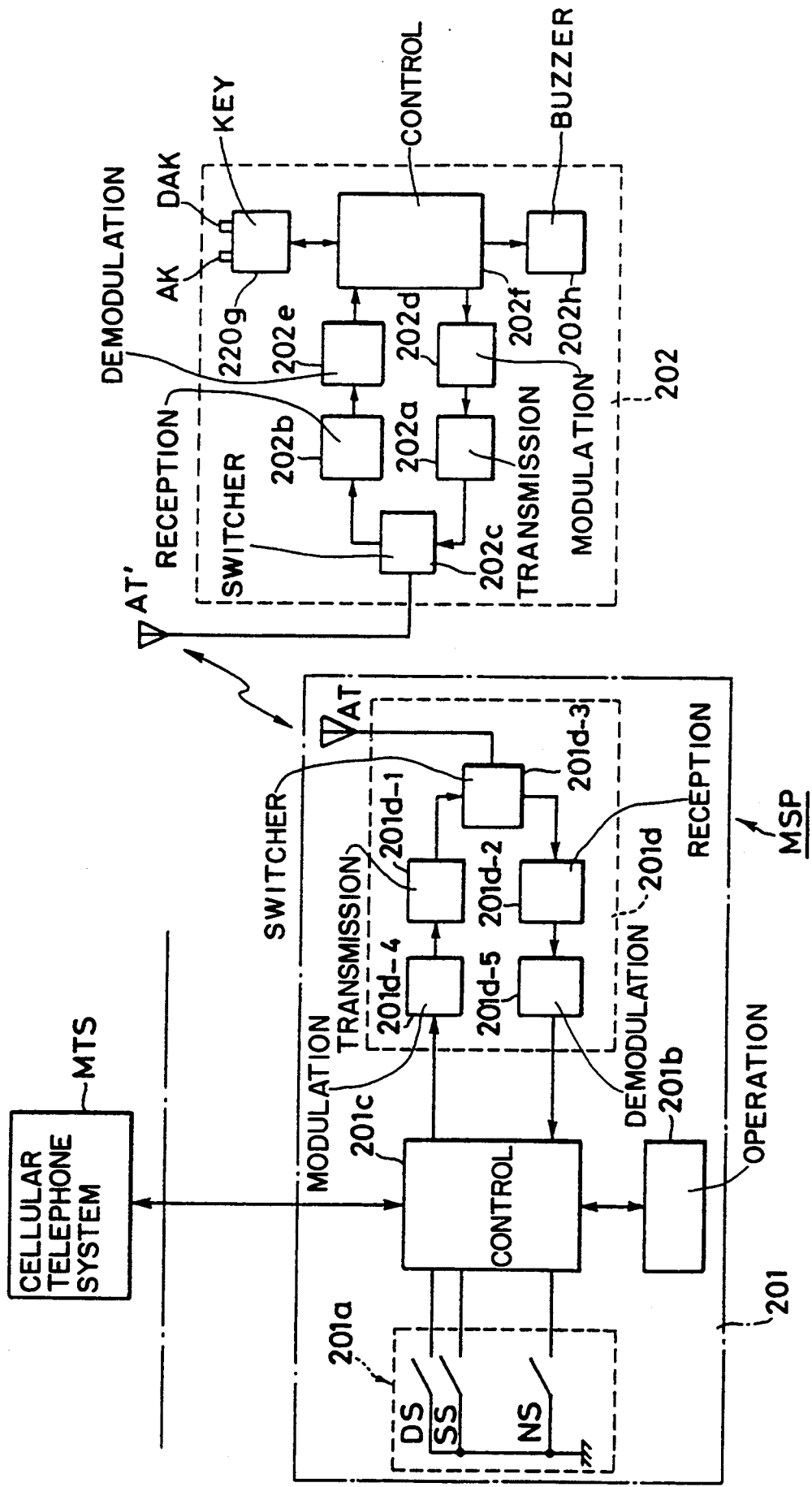
FIG. 3 is a block diagram of an anti-theft system.

FIGS. 2 and 3 are block diagrams of a system to which a method of monitoring the sound within a car according to the present invention is applied, wherein FIG. 2 is a block diagram of a mobile telephone system MTS and FIG. 3 is a block diagram of an anti-theft system MSP.

In FIG. 2, the symbol MTS denotes a cellular mobile telephone system, which includes a control unit 101, a transceiver unit 102, T-connectors 103a, 103b and an antenna 104.

The control unit 101 is, electrically, composed of a control portion 101a having a computer structure, a microphone 101b, a speaker 101c, and an operation and display portion 101d, sound path switchers 101e, 101f, a hook switch 101g, and a power source control circuit 101h. The control unit 101 is, mechanically, composed of a handset HDS and a base unit BSU, as shown in FIG. 4.

The microphone 101b and the speaker 101c are provided on the reverse sides of the handset HDS, and on the upper side thereof, are provided, as shown in FIG. 5, a ten-key portion 101d-1 for inputting a telephone number or the like, a function key portion 101d-2 having a send key SND and an end key END, etc., and a display portion 101d-3 which displays a dialed number.

Figure 1:
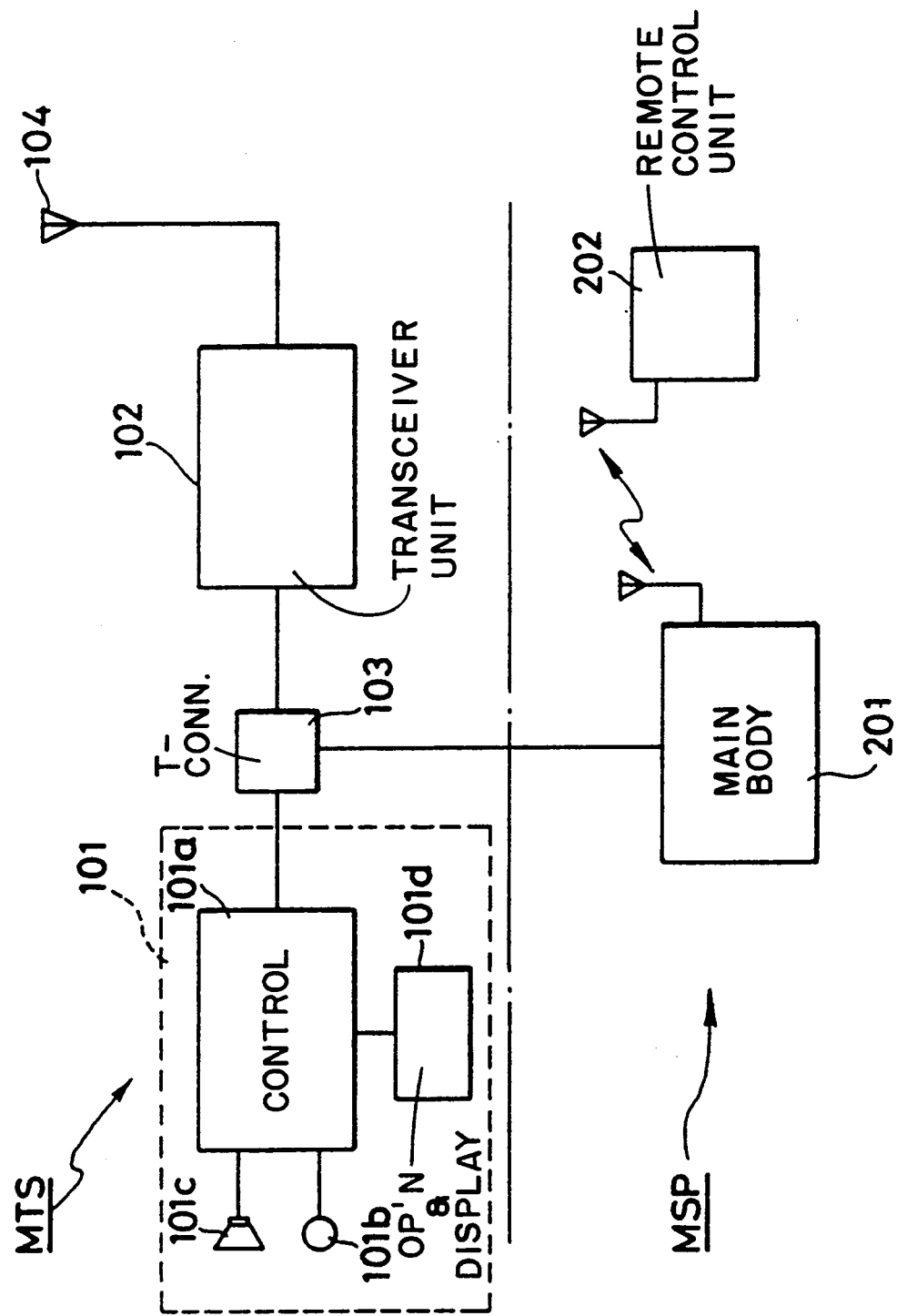
FIG. 1 is a block diagram of the principle of the present invention.

The base unit BSU has, as shown in FIG. 4, a panel portion 101d-4, a speaker receiving portion SRS and a microphone receiving portion MRS. The panel portion 101d-4 is provided with an on/off power switch PW, an auxiliary switch AUX, an alert volume control portion ALV for controlling the speaker level of a ringing tone, a handset volume control portion HSV for controlling the volume of the receiving tone of the handset HDS and a display portion DSP for displaying various values. The ten-key portion 101d-1, the function key portion 101d-2, the display portion 101d-3 of the handset HDS together with the panel portion 101d-4 of the base unit BSU constitute the operation and display portion 101d shown in FIG. 1.

The transceiver unit 102 includes a reception portion 102a, a transmission portion 102b, a duplexer 102c for connecting the antenna 104 to the reception portion or the transmission portion by appropriate change-over, a synthesizer 102d for producing a predetermined frequency signal, a control portion 102e, a demodulation portion 102f for demodulating digital data, a modulation portion 102g for modulating digital data, a sound path switcher 102h for changing over the sound form the microphone to digital data and outputting it, a sound path switcher 102i for changing over the sound signal from the reception portion 102a to a tone for a tone generator (not shown) and outputting it, and a power source control circuit 102j.

The control unit 101 and the transceiver unit 102 are connected to each other by a plurality of power control lines PL, digital data transmitting/receiving lines DL, a sound reception line SLR, a sound transmission line SLT, and the like. Several necessary lines are selected from them and connected to the anti-theft system MSP through the T-connectors 103a and 103b.

In FIG. 3, the symbol MSP represents the anti-theft system, which includes a main body 201 and a remote control unit 202, known as a "pager", which externally actuates the anti-theft function and releases the actuated state, and outputs the alarm indicating the occurrence of abnormality.

The main body 201a includes a sensor portion 201 for detecting something unusual suggestive of theft, an operation portion 201b having a keyboard structure, a control portion 201c having a micro computer structure, and a transmission/reception portion 202d. The sensor portion 201a includes a door sensor DS for detecting the opening and closing of a door, a shock sensor SS for detecting any shock exceeding a predetermined value, a noise sensor NS for detecting any noise within the car exceeding a predetermined value, a sensor for detecting the opening and closing of a trunk, etc. The operation portion 201b includes a ten-key portion and a function key portion, and is operated when inputting a registered number (ID code), actuating the anti-theft function of the system, or releasing the actuated anti-theft function. The transmission/reception portion 201d includes a transmission portion 201d-1, a reception portion 201d-2, a switching portion 201d-3 for connecting the antenna AT to the transmission portion or the reception portion by appropriate change-over, a modulation portion 201d-4 for modulating the digital data which is output from the control portion 201c, and a demodulation portion 201d-5 for demodulating the signal which is input from the reception portion 201d and inputting it to the control portion 201c.

The remote control unit 202 includes a transmission portion 202a, a reception portion 202b, a switching portion 202c for connecting an antenna AT' to the transmission portion 202a or the reception portion 202b by appropriate change-over, a modulation portion 202d, a demodulation portion 202e, a control portion 202f, a key portion 202g having a key AK (which is called an arming key) for actuating the anti-theft function of the anti-theft system MSP and a key DAK (which is called a disarming key) for releasing the actuated state of the anti-theft function, and a buzzer 202h for outputting the alarm indicating the fact that something unusual has occurred.

Figure 6:
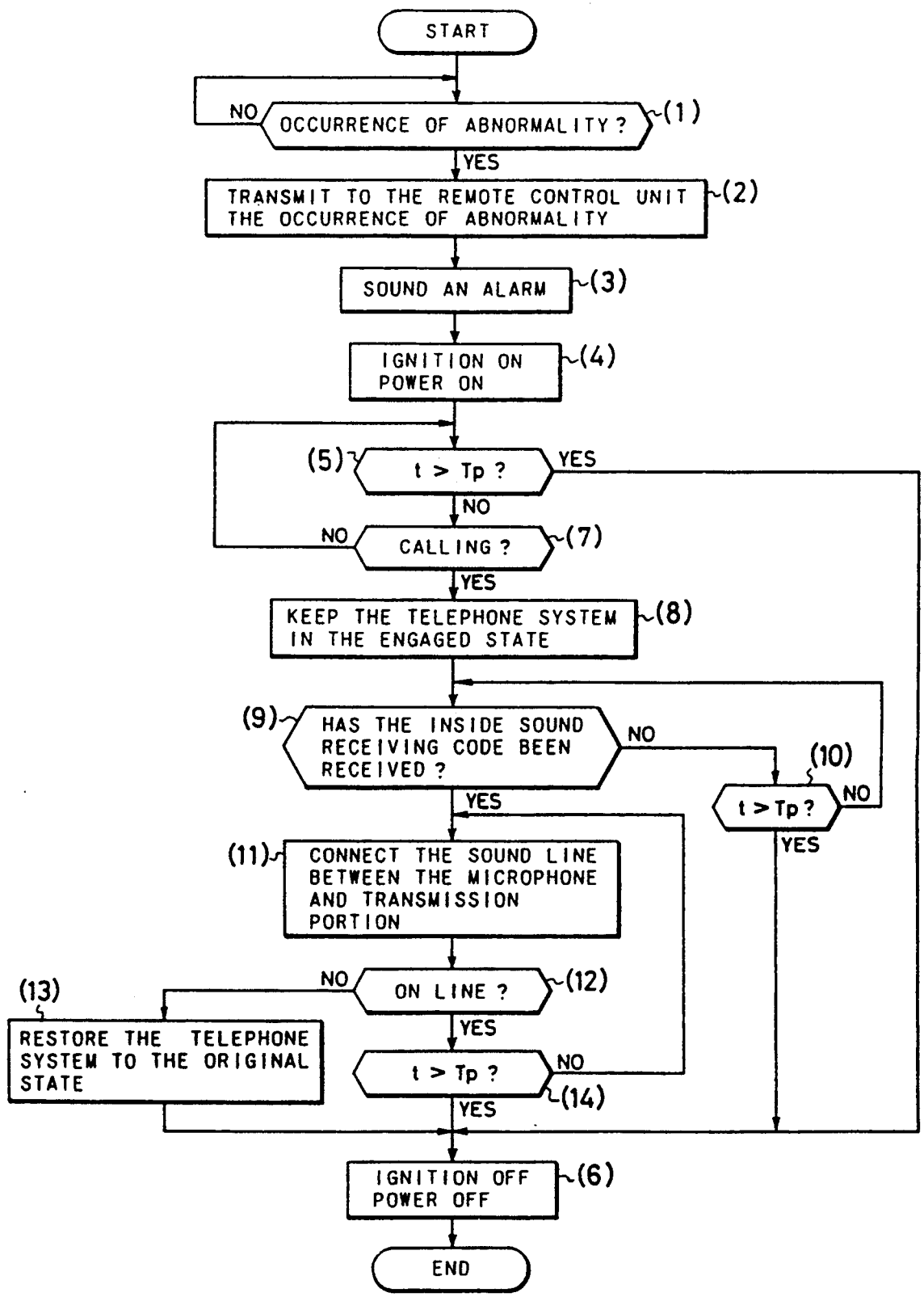
FIG. 6 is a flowchart of the process of the method according to the present invention.

A method of monitoring the sound within a car according to the present invention will now be described with reference to the flowchart shown in FIG. 6.

When the driver leaves the car, the anti-theft system MSP is actuated, while the mobile telephone system is turned off by operating the power on/off switch of the mobile telephone system MTS (FIG. 4).

In this state, the following steps are executed.

(1) Constant monitoring is performed by the control portion 201c of the anti-theft system MSP to establish whether or not the sensor portion 201a has detected any abnormality.

(2) If abnormality has occurred and a predetermined sensor is turned on, the control portion 201c of the anti-theft system MSP immediately identifies this fact and input a predetermined code signal indicating the occurrence of abnormality to the remote control unit 202 through the transmission/reception portion 201d.

(3) Immediately after the remote control unit 202 receives the code indicating the occurrence of abnormality, the control portion 202f outputs an alarm by actuating the buzzer 202h. the buzzer 202h is automatically turned off after a predetermined time, or is turned off by pressing a stop key (not shown) provided on the key portion 202g.

(4) If an abnormality has occurred, the control portion 201c causes the mobile telephone system to enter a state wherein the power to the mobile telephone system MTS is switched on. In other words a power control signal is output to the power control line, and simultaneously the timing starts.

(5) The control portion 201c compares the elapsed time t with a predetermined power-on duration time $T_P$, as occasion demands, and a judgement is made as to whether or not $t > T_P$.

(6) If $t > T_P$, the control portion 201c turns off the power to the mobile telephone system MTS.

(7) On the other hand, if $t \leq T_P$, a judgement is made by the control portion 102e of the transceiver unit 102 as to whether or not there is an external call.

(8) When the control portion 102e of the transceiver unit 102 of the mobile telephone system MTS is called, it executes ordinary call-reception processing, and at the same time keeps the mobile telephone system in the off hook state. This processing enables the mobile telephone system to receive a signal from an external telephone. The sound lines SLR and SLT between the control unit 101 and the transceiver unit 102 are cut by the respective sound path switchers 101e, 101f, 102i, 102h.

(9) In this state, the control portion 102e of the transceiver unit 102 waits for the code for collecting the sound within the car (hereinunder referred to as "inside sound receiving code") to be delivered. It is necessary to use a push-button telephone when collecting the sound within the car, because the code or the like must be delivered.

(10) While the inside sound receiving code remains undelivered, a judgement is made as to whether or not $t > T_P$ until the inside sound receiving code is transmitted. If $t > T_P$, the process returns to the step (6).

(11) When the inside sound receiving code is delivered, the control portion 102e of the transceiver unit 102 transmits it to the control portion 101a of the control unit 101 through data line DL, and at the same time connects the sound transmission line with the transmission portion 102b through switch 102h. The control portion 101a of the control unit 101 outputs an inside sound signal from the microphone 101b to the sound transmission line SLT through the sound path switcher 101f. Thus the sound within the car which is collected by the microphone 101b is transmitted from the antenna 104 through the transmission portion 102b.

(12) A judgement is made by the control portion 102e as to whether or not the person at the other end has put back the receiver and the line is off.

(13) If the line is off, the mobile telephone system is returned to the original on hook state and step (6) is executed.

(14) If the line is not off, the transmission of the sound within the car is continued until the elapsed time t exceeds the power-on duration time $T_P$. When the elapsed time t has exceeded the power-on duration time $T_P$, the process returns to the step (6).

Although this embodiments is so designed that the sound within the car is transmitted when the inside sound receiving code is received, it is also possible to construct the mobile telephone system so that the sound within the car can be transmitted when the ringing tone is received.

Furthermore, although the sound collected by the microphone 101b provided on the handset HDS is transmitted in this embodiment, if the mobile telephone system is equipped with a hand-free phone (provided with a microphone and a speaker), it is also possible to transmit the sound within the car which is collected by the microphone of the hand-free phone.

As described above, since the method according to the present invention enables not only the occurrence of abnormality to be reported to the remote control unit when abnormality occurs, but also the mobile telephone system to assume a state in which it is capable of receiving external calls so that the sound within the car is transmitted to the caller, it is possible to monitor the sound within the car and ascertain the actual state of the car accurately at a place remote from the car.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. An apparatus for remotely monitoring the sound in a vehicle equipped with a mobile telephone system and an anti-theft system, comprising:

a controller in the anti-theft system for monitoring the condition of the vehicle, wherein the controller is connected to the telephone system and includes means for turning on the telephone system to a power-on state, the telephone system initially being in the power-off state when the vehicle is unattended to be protected by the anti-theft system;

the controller including means for turning on the telephone system when an abnormal condition of the vehicle is detected by the anti-theft system, to allow the telephone system to receive an incoming call; and the telephone system including means for connecting a microphone of the telephone system within the vehicle to a transmitter of the telephone system upon receipt of said incoming call, to enable monitoring of sound within the vehicle.

2. An apparatus according to claim 1, further comprising:

in the controller, means for determining a time the power-on state of the telephone system is maintained; and in the controller, means for turning off the telephone system when the determined time is a predetermined time period.

3. An apparatus for remotely monitoring the sound in a vehicle equipped with a mobile telephone system, comprising:

a controller in the anti-theft system for monitoring the condition of the vehicle, the controller being connected to the telephone system and including a control portion for turning on the telephone system to a power-on state, the telephone system initially being in the power-off state when the vehicle is unattended to be protected by the anti-theft system;

the control portion turning on the telephone system when an abnormal condition of the vehicle is detected by the anti-theft system to allow the telephone system to receive an incoming call; and a receiving microphone in the telephone system within the vehicle which is connected to a transmitter of the telephone system upon receipt of said incoming call, to enable monitoring of sound within the vehicle.

4. An apparatus according to claim 3, wherein:

the controller includes means for determining a time the power-on state of the telephone system is maintained; and the controller includes a switch for turning off the telephone system when the determined time is a predetermined time period.

5. A method for remotely monitoring the sound in a vehicle equipped with a mobile telephone system and an anti-theft system, comprising the steps of:

monitoring the condition of the vehicle with a controller;

connecting the controller to the telephone system and turning on the telephone system with the controller to a power-on state;

initially placing the telephone system in the power-off state when the vehicle is unattended to be protected by the anti-theft system;

turning on the telephone system with the controller when an abnormal condition of the vehicle is detected by the anti-theft system, to allow the telephone system to receive an incoming call from the owner; and connecting a microphone of the telephone system within the vehicle to a transmitter of the telephone system upon receipt of said incoming call, to enable monitoring of sound within the vehicle.

6. A method according to claim 5, further comprising the steps of:

determining a time the power-on state of the telephone system is maintained; and turning off the telephone system when the determined time is a predetermined time period.

7. A method for remotely monitoring the sound in a vehicle equipped with a mobile telephone system and an anti-theft system with a controller unit for monitoring the condition of the vehicle, and with a remote control unit carried by an owner of the vehicle to which the occurrence of an abnormality indicative of theft is signalled by the anti-theft system, comprising:

connecting the controller unit of the anti-theft system to the telephone system and providing the controller unit with means for turning on the telephone system to a power-on state;

initially placing the telephone system in the power-off state when an owner of the vehicle leaves the vehicle unattended to be protected by the anti-theft system;

turning on the telephone system with the controller unit when an abnormal condition of the vehicle is detected by the anti-theft system in order to allow the telephone system to receive an incoming call from the owner; and the telephone system having means for detecting a predetermined code which is transmitted through the incoming call to the telephone system, and means for connecting a receiving microphone of the telephone system within the vehicle to a transmitter of the telephone system upon detection of the predetermined code in order to enable monitoring of sound within the vehicle.

8. A method for remotely monitoring the sound in a vehicle according to claim 7, the controller unit having means for determining a time the power-on-state of the telephone system is maintained; and operating the controller unit to turn off the telephone system when the determined time is a predetermined time period.

9. An apparatus for remotely monitoring the sound in a vehicle equipped with a mobile telephone system and an anti-theft system, comprising:

a controller in the anti-theft system for monitoring the condition of the vehicle, wherein the controller is connected to the telephone system and includes means for turning on the telephone system to a power-on state, the telephone system initially being in the power-off state when the vehicle is unattended to be protected by the anti-theft system;

a transceiver in the anti-theft system receiving from a remote unit signals for arming or disarming the anti-theft system, and transmitting to said remote unit an alarm signal for indicating the occurrence of an abnormal condition of the vehicle;

the means for turning on the telephone system turning on the telephone system when the abnormal condition of the vehicle is detected by the anti-theft system, to allow the telephone system to receive an incoming call; and the telephone system including means for connecting a microphone of the telephone system within the vehicle to a transmitter of the telephone system upon receipt of said incoming call, to enable monitoring of sound within the vehicle.

10. An apparatus according to claim 9, further comprising:

in the controller, means for determining a time the power-on state of the telephone system is maintained; and in the controller, means for turning off the telephone system when the determined time is a predetermined time period.

* * * * *